United States Patent [19]

Gerhard

[11] Patent Number: 4,892,450
[45] Date of Patent: Jan. 9, 1990

[54] FASTENING ELEMENT CONSISTING OF A TIE BOLT AND A CLAMPING WEDGE

[75] Inventor: Anton Gerhard, Nuernberg, Fed. Rep. of Germany

[73] Assignee: "Toge-Dubel" A. Gerhard Gmbh, Nuernberg, Fed. Rep. of Germany

[21] Appl. No.: 170,928

[22] Filed: Mar. 21, 1988

[30] Foreign Application Priority Data

Mar. 21, 1987 [DE] Fed. Rep. of Germany ....... 3709361

[51] Int. Cl.⁴ ............................................. F16B 13/04
[52] U.S. Cl. ...................................... 411/78; 411/79; 411/446
[58] Field of Search ............................. 411/41, 78–80, 411/446–449, 39, 40, 45–48

[56] References Cited

U.S. PATENT DOCUMENTS

| | | | |
|---|---|---|---|
| 1,864,300 | 6/1932 | Forrest | 411/80 X |
| 4,275,637 | 6/1981 | Herb et al. | 411/78 |
| 4,312,611 | 1/1982 | Herb | 411/79 X |
| 4,312,615 | 1/1982 | Herb | 411/78 |
| 4,427,327 | 1/1984 | Herb | 411/78 |
| 4,602,902 | 7/1986 | Herb | 411/45 |

FOREIGN PATENT DOCUMENTS

2905337 8/1980 Fed. Rep. of Germany ........ 411/75
3237468 4/1984 Fed. Rep. of Germany ........ 411/33

*Primary Examiner*—Gary L. Smith
*Assistant Examiner*—Douglas E. Ringel
*Attorney, Agent, or Firm*—Browdy and Neimark

[57] ABSTRACT

A fastening element comprises a tie bolt (1) and a clamping wedge (2) which for the purpose of transporting and insertion into a bore hole (24) are clamped together via a flange (5), which at the same time is used for attachment of a load (25) to a ceiling (23). To prevenr trouble when inserting the clamping wedge (2), it is provided on its outer face (11) with protrusions (21) which, in the non-extended state of the fastening element, abut on an open passage (19) of the flange (5), while otherwise the outer face (11) of the clamping wedge (2) has free play in respect to the open passage (19) of the flange (5).

11 Claims, 2 Drawing Sheets

FASTENING ELEMENT CONSISTING OF A TIE BOLT AND A CLAMPING WEDGE

FIELD OF INVENTION

The invention relates to a fastening element. More especially, it relates to a fastening element consisting of a tie bolt and a clamping wedge with a flange having an open passage for the clamping wedge provided in the rear end of the tie bolt, the tie bolt being provided in its frontal area with a wedge face which is inclined from the front end to the rear end in the direction of the central longitudinal axis of the tie bolt, where an adjoining face extends generally parallel to the central longitudinal axis and reaches as far as the rear end, where the clamping wedge, in its non-extended state, complements the tie bolt to form an approximately cylindrical shape for abutting with a contact face on the axis-parallel face and with an expansion face on the wedge face, and where the front end of the clamping wedge does not extend to the front end of the tie bolt and the rear end of the clamping wedge extends beyond the flange, the clamping wedge being frictionally held in its non-extended state in the open passage of the flange.

BACKGROUND OF THE INVENTION

In a fastening element of the above general type, known from U.S. Pat. No. 4,275,637, the flange is not in a closed, i.e. annular, shape but only encircles the outer face of the clamping wedge across a comparatively short area. In this way no sufficient securing for transport, i.e. a sufficiently secure axial connection between tie bolt and clamping wedge in its nonextended state, is provided. Also, when inserting the fastening element into a drilled hole, which in common practice is done by means of light taps with a hammer, there is the danger that spreading, i.e. a relative displacement of the clamping wedge in respect to the tie bolt, will take place before the tie bolt abuts with its flange on the part to be fastened.

In order to take care of these problems, the ends of the flange which grip the ends of the clamping wedge in a talon-like manner are connected with the clamping wedge by means of gluing, welding, soldering or the like, so that there is a firm connection which, however, may be undone by hammer blows or the like. This solution is structurally complicated and furthermore does not assure a perfect movement of the clamping wedge following the breaking of the glued, welded or soldered connection.

SUMMARY OF THE INVENTION

It is an object of the invention to provide a fastening element of the general type described in such a way that, with simple construction and ease of fabrication and while maintaining security during transport and insertion, dependable spreading with as small as possible an expenditure of force is assured.

This object is attained by the invention by providing the clamping wedge on its outer face with protrusions extending therebeyond which firmly abut in their non-extended state against the open passage in the flange; and in that otherwise the outer face of the clamping wedge has free play in respect to the open passage.

By the aforementioned means provided by the invention, it is assured that during transport and insertion and, in certain cases even under light hammer blows, the clamping wedge remains firmly held between the flange and the corresponding face of the tie bolt by means of friction. When the protrusions are no longer engaged with the flange immediately after the start of driving in of the clamping wedge, there is sufficient play between the clamping wedge and the tie bolt so that there are no longer any substantial frictional forces which might hamper the driving in of the clamping wedge and which might be transferred to the load to be attached whereby the load could be damaged. The clamping wedge in itself is formed completely straight so that there is no danger during driving in of it becoming bent in its rear area or breaking.

In accordance with a further aspect of the invention wherein the clamping wedge in its non-extended state has a slightly larger size in the region of its protrusions in comparison with the open passage of the tie bolt, a particularly strong connection of tie bolt and clamping wedge in the non-extended state is achieved.

An especially trouble-free driving end of the clamping wedge is in particular aided by ensuring that the outer face of the clamping wedge is partly cylindrical.

By providing at least two protrusions between the contact face and the outer face of the clamping wedge, preferably on the outer face, a particularly simple manufacture of the protrusions is achieved. In this case, it is possible to push the protrusions out of the surface material of the clamping wedge from the direction of the contact face. It is particularly advantageous to provide only these two protrusions. Moreover, it is advantageous to provide the protrusions on the outer face of the clamping wedge in a symmetrical manner.

Further advantages and characteristics of the inventions can be seen from the description below of a preferred embodiment taken in conjunction with the drawings.

DETAILED DESCRIPTION OF A PREFERRED EMBODIMENT

Figure 1:
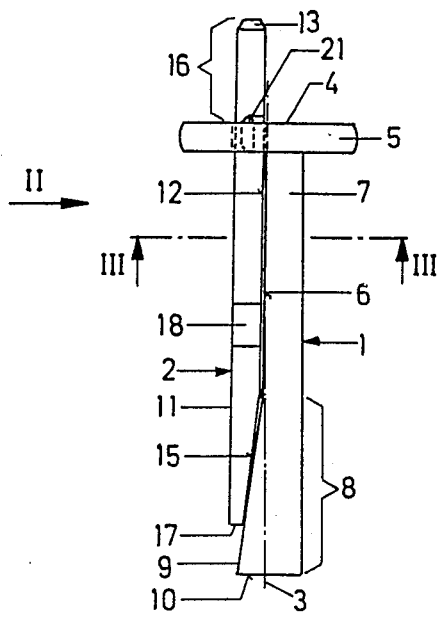
FIG. 1 shows a fastening element in the non-extended state in a lateral longitudinal view from the direction of the arrow I of FIG. 2.

The fastening element shown in the drawings comprises a tie bolt 1 and a clamping wedge 2. The tie bolt 1 in its basic construction consists of a massive cylinder comprising a sector of a circle and having a central longitudinal axis 3 which, for simplicity's sake, is also designated as the central longitudinal axis 3 of the entire fastening element. The tie bolt 1 has on its rear end 4 an annular flange 5 which noticeably projects radially outwardly and is formed,, of one piece with the tie bolt 1, for example by having been correspondingly deformed therefrom.

Figure 2:
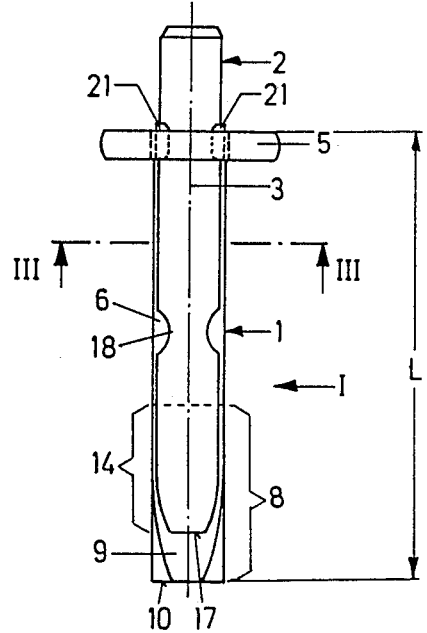
FIG. 2 shows the fastening element of FIG. 1 in longitudinal top view from the direction of the arrow II of FIG. 1.

From the rear end 4 of the tie bolt 1 a face 6 extends across approximately half to two-thirds of its entire length L parallel to the axis 3 and in its vicinity, so that the cylinder face 7 of the tie bolt 1 only extends in this area across a segmental angle of 180° as shown, or preferably 190° to 200° not shown. In the frontal area 8 of the tie bolt 1 a wedge face 9 extends —beginning at the face 6 —and is thus inclined towards the axis 3 from the front end 10 of the tie bolt 1. At the front end 10 the cross-section of the tie bolt again approximates a circular shape —although not completely —as seen in FIG. 2. The wedge face 9 and the face 6 are desirably flat, but need not be so.

Figure 4:
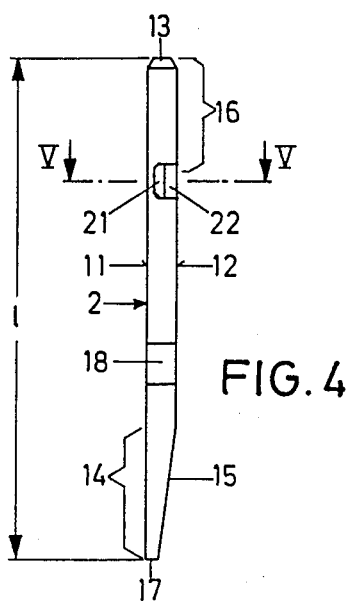
FIG. 4 shows a lateral longitudinal view of a clamping wedge.
Figure 3:
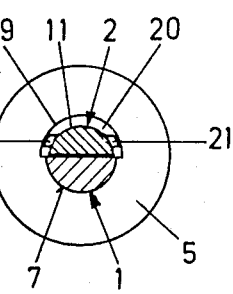
FIG. 3 shows a section through the fastening element taken along section lines III—III of FIGS. 1 and 2.
Figure 5:
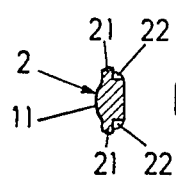
FIG. 5 shows a cross-sectional view of the clamping wedge taken along the section line V—V of FIG. 4.

The clamping wedge 2 also is formed by a cylinder in the shape of a segment of a circle, as can be seen from FIGS. 3 and 4. The diameter of its associated cylinder, however, is slightly smaller than that of the tie bolt 1, as can be seen in FIG. 2 and 3. Its outer face 11 thus is also a partial cylinder surface, the generatrices of which extend parallel to each other —the same as in the case of the outer face of the tie bolt 1 formed by the cylinder faces 7. The clamping wedge 2 has a contact face 12 adapted to the face 6 of the tie bolt 1. This contact face 12 extends from the rear end of the clamping wedge 2 in the nonextended state of the fastening element up to the transition from the face 6 into the wedge face 9 of the tie bolt 1. In the frontal area of the clamping wedge 2, a spreading face 15 adjoins the contact face 12 which in the non-extended state of the fastening element abuts at least partially on the wedge face 9 of the tie bolt 1.

As can be seen from FIGS. 1 and 2, the rear end 13 of the clamping wedge 2 extends in the non-extended state of the fastening element backwards beyond the flange 5 by a maximal penetrating area 16. The front end 17 of the clamping wedge 2 in this case lies behind the front end 10 of the tie bolt 1; the length l of the clamping wedge 2, however, is a little greater than the total length L of the tie bolt 1. From the foregoing also ensues that the length of the spreading face 15 is smaller than the length of the wedge face 9, both in the direction of the axis 3, while the length of the contact face 12 is obviously larger than the length of the face 6, again both in the direction of the axis 3.

In the area in back of the spreading face 15 the clamping wedge 2 has a compression zone 18, as it is known from German Patent 29 05 337.

The flange 5 has an open passage 19 through which the clamping wedge 2 extends. This opening 19 also has, the same way as the clamping wedge 2, a cross-section in the shape of a sector of a circle, the radius of which, however, is a little larger than that of the clamping wedge 2, so that its outer face 11 has a degree of play of from 0.2 to 0.4 mm with respect to the opening 19, as can be seen in FIG. 3.

The clamping wedge 2 has, in the non-extended state of the fastening element, in the area lying inside of the flange 5, two protrusions 21 which have been formed and project outwardly from the direction of the contact face 12, and also small recesses 22 which have been formed between these protrusions 21 and the contact face 12. These protrusions have, in the direction of the axis 3, a slightly greater length than the thickness of the flange 5. In the uninstalled state of the clamping wedge 2, these protrusions 21 are slightly larger when compared to the circumference of the opening 19 so that they are slightly deformed during insertion of the clamping wedge 2 through the opening 19 to the position shown in FIGS. 1 and 2, by reason of which the clamping wedge 2 is very firmly connected in the axial direction with the tie bolt 1. As can be seen from FIG. 3, the protrusions 21 only abut on a small area of the opening 19, while the largest part of the outer face 11 of the clamping wedge 2 is exposed in respect to the opening 19. To this extent the deformation of the protrusions 21 mentioned during the pushing in of the clamping wedge 2 into the flange 5 of the tie bolt 1 is possible with obvious variations in the dimensions of the tie bolt 1 with the flange 5 relative to the clamping wedge 2 with the protrusions 21.

Installation of such a fastening element is performed as follows, it being pointed out that such fastening elements may be used as so-called ceiling nails, i.e. for attaching loads to concrete ceilings.

In a ceiling 23 a bore hole 24 is made, having a diameter slightly larger than the diameter of the tie bolt 1. Then a part 25, which is to be attached and which has a hole 26 corresponding to the bore hole 24 and which is, if desired, drilled at the same time as the bore hole 24, is brought up against the ceiling 23 such that the hole 26 and the bore hole 24 overlap. Then the non-extended fastening element shown in FIGS. 1 to 3 is inserted into the bore hole 24 through the hole 26 with the front end 10 of the tie bolt 1 being inserted first. Insertion is finished when the part 25 is pressed against the ceiling 23 by means of the flange 5.

Then the clamping part 2 is driven into the bore hole 24 by means of hammer blows against its rear end 13, without the position of the tie bolt 1 in the direction of the axis 3 changing appreciably. Because of the movement of the spreading face 15 on the wedge face 9, at least the front area 14 of the clamping wedge 2 is moved radially with respect to the tie bolt 1, by which the total cross-section of the fastening element increases in its frontal area. A wedging of the tie bolt 1 and the clamping wedge 2 in the bore hole 24 occurs because of this spreading. Depending on the hardness of the material of the ceiling 23 and the excess size of the bore hole 24 in comparison with the fastening element, the clamping wedge 2 is driven in at variable depths. Since it is very slim in its front area 14 and particularly in its front end 17, and since normally the front end 10 of the tie bolt 1 does not extend to the bottom 27 of the bore hole, as a rule the clamping wedge 2 can be driven in to the extent that its rear end 13 lies flush with the flange 5, as shown in FIG. 6.

Because the protrusions 21 extend from the outer face 11 into transition zones between the contact face 12 and the outer face 11, the outer face 11 of the clamping wedge 2 located between the protrusions 21 does not, even at the start of the spreading process, come into contact with the flange 5 in the area of the opening 19, because the size of the gap 20 is greater than the distance resulting from lifting of the clamping wedge 2 in the area of the flange 5 due to the movement of the spreading face 15 on the wedge face 9. After the driving in of the clamping wedge 2 has taken place to about one-third, the protrusions 21 do not engage the flange 5 anyway, so that here the total outer face 11 of the clamping wedge 2 no longer comes into contact with the flange 5. The clamping wedge 2 can find its own way inside the bore hole 24 depending on its course and the local differences in the hardness of the material of the ceiling 23. Instead of a ceiling 23, such a fastening element can, of course, also be used in walls of concrete or hard brick.

Because the length l of the clamping wedge 2 is greater than the length L of the tie bolt 1, a part of the front area 14 of the clamping wedge 2 is pushed beyond the front end 10 of the tie bolt 1 into the bore hole 24. It pushes itself laterally into the ceiling 23 so that firm closure between the fastening element as a whole and the ceiling is attained because the bore hole is widened beyond its cylindrical shape. This makes the pulling out of the fastening element, within the limits of the stability of the ceiling or the brick work, impossible. This is even true when the part of the clamping wedge 2 associated with the front end 17 and extending beyond the front end 10 of the tie bolt 1 is slightly bent inward again, so that the front end 17 is approximately flush with the wall of the bore hole 24. In the region of the front end 10 of the tie bolt 1 the corresponding area of the clamping wedge 2 is in every case forced into the ceiling 23. This effect which is based only on the greater length l of the clamping wedge 2 in comparison to the length L of the tie bolt 1 is, in principle, independent of the design of the clamping wedge 2 with the protrusions 21. The relationship: $1.1 \leq l/L \leq 1.3$ applies here.

Figure 6:
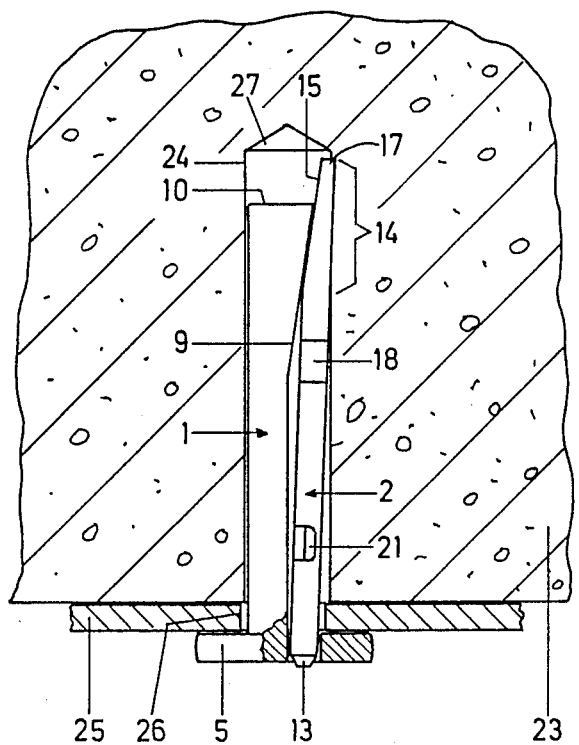
FIG. 6 shows a lateral longitudinal view of a fastening element in the spread-open state in an environment of use.

If the hole 24 is so narrow that the clamping wedge 2 cannot be totally inserted into the position according to FIG. 6, the clamping wedge 2 will be compressed in the clamping zone 18, where the clamping wedge is weakened by apertures or recesses.

It is to be understood that the above invention is not limited to the exemplary embodiment described and that further improvements and variants are possible within the scope of the invention.

What is claimed is:

1. A fastening element comprising a tie bolt (1) having a front end (10) and a rear end (4), and a clamping wedge (2) having a front end (17) and a rear end (13),
    said tie bolt (1) having an annular flange provided in said rear end (4), said annular flange (5) having an open passage (19) for receiving therein said clamping wedge (2), said tie bolt (1) having a frontal area (8) provided with a wedge face (9) which is inclined from said front end (10) to said rear end (4) in the direction of a central longitudinal axis (3) of said tie bolt (1), said tie bolt (1) having an adjoining face (6) extending generally parallel to the central longitudinal axis (3) and reaching as far as said rear end (4),
    said clamping wedge (2) having a contact face (12) and an outer face (11), said clamping wedge (2) —in its non-extended state— complementing said tie bolt (1) to form an approximately cylindrical shape with said contact face (12) on said adjoining face (6) and with said clamping wedge (2) having an expansion face (15) on said wedge face (9), and where said front end (17) of said clamping wedge (2) does not extend to the front end (10) of said tie bolt(1) and the rear end (13) of the clamping (2) extends beyond said annular flange (5),
    said outer face (11) having a radius smaller than the radius of said open passage (19) so as to provide a gap between said open passage (19) and said outer face (11), and frictional retaining means for holding said clamping wedge (2) in its non-extended state in said open passage (19) of said flange (5), said frictional retaining means comprising protrusions (21) extending from said outer face (11) and abutting against said open passage (19) of said flange (5) when said clamping wedge (2) is in its non-extended state, the smaller radius of said outer face (11) relative to the radius of said open passage (19) providing free play after said clamping wedge (2) is pushed in the direction of said front end (10) of said tie bolt (1) to the extent that said protrusions (21) no longer abut said open passage (19).

2. A fastening element in accordance with claim 1, wherein at least two protrusions (21) are provided.

3. A fastening element in accordance with claim, 1, wherein only two protrusions (21) are provided.

4. A fastening element in accordance with claim 1, wherein the clamping wedge (2) is mirror-symmetrical to a plane of symmetry extending perpendicularly to the contact face (12) and through the central longitudinal axis (3) and the protrusions (21) are disposed symmetrically in relation to said plane of symmetry.

5. A fastening element in accordance with claim 1, wherein during formation the protrusions (21) are forced out of the clamping wedge (2) while adjacent recesses (22) are formed.

6. A fastening element in accordance with claim 1, wherein for the relationship of the length (l) of the clamping wedge (2) to the length (L) of the tie bolt (1) the relationship $1.1 \leq l/L \leq 1.3$ applies.

7. A fastening element according to claim 1 wherein said protrusions (21) are slightly deformed during insertion of said clamping wedge through the open passage (19), so that said protrusions (21) are slightly deformed in contact with said open passage (19) in the non-extended state of said fastening element.

8. A fastening element according to claim 1 wherein said free play constitutes a gap having a width greater than the distance resulting from lifting said clamping wedge (2) in the area of said flange (5) due to the movement of said expansion face (15) on said wedge face (9).

9. A fastening element according to claim 8 wherein said gap has a width of 0.2 to 0.4 mm.

10. A fastening element according to claim 1 wherein said protrusions (21) have a length slightly greater than the thickness of said flange (5).

11. An axially elongated fastening element assembly for insertion into a prepared hole and for locking therein, comprising
    an elongated tie bolt having a front end and a rear end, said tie bolt having an annular flange at its rear end, said flange having a central opening extending therethrough, said tie bolt having a wedge face inclined from its front and toward its rear end in the direction of a central longitudinal axis of said tie bolt, said tie bolt further having a face extending generally parallel to the central longitudinal axis and extending from said wedge face to said annular flange;
    an elongated clamping wedge having a front end and a rear end, said clamping wedge extending through said central opening of said annular flange of said tie bolt, said clamping wedge having an expansion face for sliding contact with said wedge face of said tie bolt;
    said clamping wedge having an outer surface generally complimentary in shape to said central opening through said annular flange of said tie bolt, but with said clamping wedge being smaller than said open passage so as to leave a gap therebetween; and
    protrusions extending outwardly from said outer surface of said clamping wedge in the vicinity of said annular flange, said protrusions extending through said gap and being deformed against an interior wall of said annular flange defining said central opening, said protrusions firmly abutting against said interior wall so as to frictionally hold said clamping wedge within said central opening of said annular flange against axial movement relative to said tie bolt.

* * * * *